United States Patent [19]

Gassaway

[11] 4,065,083

[45] Dec. 27, 1977

[54] EQUIPMENT SECURITY DEVICE

[76] Inventor: James Scott Gassaway, 2356 Glendon Ave., Los Angeles, Calif. 90064

[21] Appl. No.: 656,097

[22] Filed: Feb. 9, 1976

[51] Int. Cl.[2] .............................................. F16B 41/00

[52] U.S. Cl. ....................................... 248/19; 248/203

[58] Field of Search ..................... 248/19, 20, 25, 203; 70/58, 62

[56] References Cited

U.S. PATENT DOCUMENTS

| | | | |
|---|---|---|---|
| 1,119,108 | 12/1914 | Nott | 248/25 |
| 2,223,028 | 11/1940 | Dobson | 248/25 X |
| 3,707,860 | 1/1973 | Singer | 70/58 |
| 3,850,392 | 11/1974 | Gassaway | 248/19 |
| 3,910,079 | 10/1975 | Gassaway | 70/58 |

*Primary Examiner*—William H. Schultz
*Attorney, Agent, or Firm*—Donald D. Mon

[57] ABSTRACT

Equipment security device for holding equipment to a surface so as to resist its ready detachment, for example holding a typewriter to a desk top in such a way as to resist both the prying of the device from the surface, and its removal by the garrot.

30 Claims, 16 Drawing Figures

EQUIPMENT SECURITY DEVICE

This application relates to apparatus for holding equipment to a surface, for example a typewriter, computer, or adding machine, to a surface such as a desk top or a table top or table.

The theft of office machinery from offices, schools and factories has become a major concern. It is frequently desired to provide means for holding the equipment to a surface, such as a desk top or a table top, preferably but not necessarily without having to make holes in the surface itself. This invention provides such means.

In the security field it is recognized that nothing is entirely theft-proof for the reason that there is very little which a thief having ample time, patience and equipment, cannot take apart to the extent necessary to remove it. This is certainly true as to office equipment where anything attached to the surface of a desk could be removed, for example simply by sawing out a portion of the desk or by destroying part of the equipment itself. It is, however, preferable to a thief that the equipment itself should not be damaged, thereby making it unsaleable. Also, it is necessary that it be removable in a very short period of time.

Police agencies believe that if they can be notified within five minutes from the start of the theft, they can apprehend the thief. Accordingly, most large-scale successful thefts must be completed within several minutes from their inception. Anything which will slow a thief down by, even for the major portion of a minute is a practical and usually a sufficient safeguard. Therefore, while the apparatus of this invention is not actually theft-proof, it is theft-resistant in that it will provide enough impediment that a thief cannot quickly remove the equipment from the surface to which it is attached.

Apparatus is known for holding down equipment utilizing a rigid plate to which the equipment is locked, and in which the plate itself is adhesively mounted to a surface, usually with some sort of shrouding means to protect the adhesive means from the direct application of a prybar. For example, in Gassaway U.S. Pat. No. 3,850,392, issued Nov. 26, 1974, entitled "Equipment Security Device", there is shown a means for attaching the plate to the surface by means of an adhesive layer. A surrounding skirt protects the adhesive layer by limiting access to it by a prybar. This has been a successful device in many applications.

As is typical in the law enforcement and protection field, a solution to one problem often gives rise to another. Put otherwise, the cleverness and numerousness of thieves will often find a means to outwit many or even most prevention techniques. Then it becomes necessary to improve on these techniques. Such is the case at the present time.

It has been found that a thief can utilize a strong garrot wire, for example a piece of piano wire, formed in a loop and pulled tightly around the base of the aforesaid device, to cut through the adhesive layer and release the equipment together with the rigid plate from the surface. Accordingly, means is provided by this invention to overcome this disadvantage and to provide to the existing device the additional assurance that a garrot cannot readily be used on it.

The instant invention is carried out in apparatus for holding equipment to a surface, which apparatus has plate means to which the equipment is attachable. Adhesive means on the bottom surface of the plate means holds the plate means to the surface. The improvement of this invention comprises garrot-resistant means including at least three cut-resistant bodies attached to the said surface independently of the plate, each of said bodies being of sufficient length as to extend from at least substantial contiguity with the surface to an elevation above the bottom surface of the plate means. At least one of the bodies is disposed off of a line drawn between two of the other bodies, whereby to form a pattern such as to exclude a garrot wire from cutting through sufficient of said adhesive means as would permit the plate means to be cut loose from the surface or readily to be broken loose therefrom.

According to a preferred but optional feature of the invention, each of said bodies comprises an elongated member having a tapered skirt which tapers inwardly as it extends upwardly from the surface, whereby to guide a garrot wire into a trapped position between the metal plate and the body.

The above and other features of this invention will be fully understood from the following detailed description and the accompanying drawings, in which.

Figure 1:
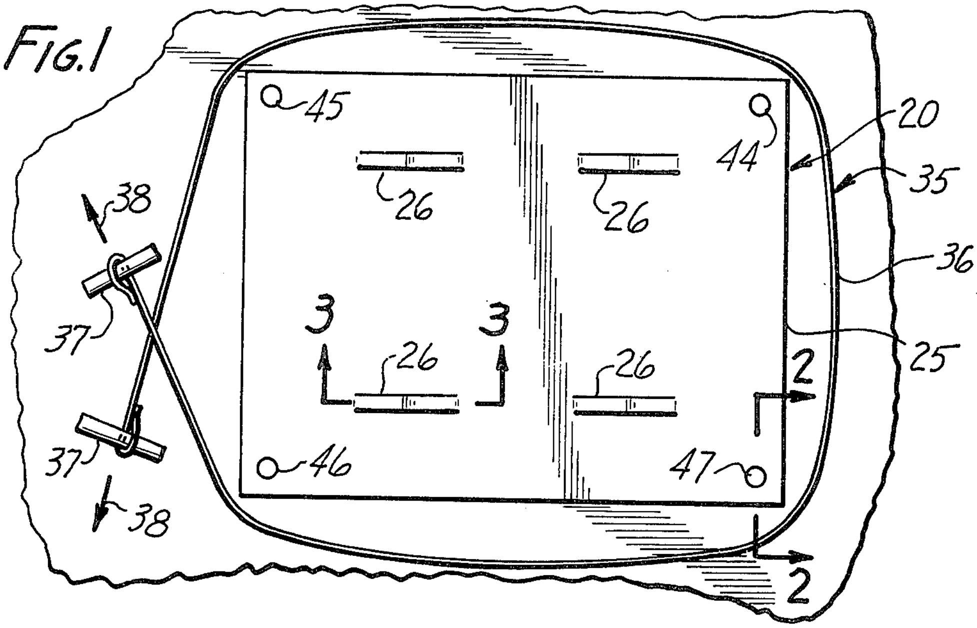
FIG. 1 is a plan view showing the invention applied to a surface, but without equipment attached thereto.
Figure 3:
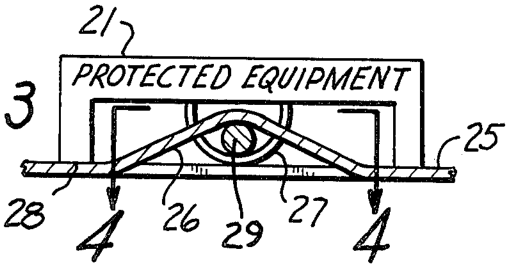
FIG. 3 is a fragmentary cross-section, partly in schematic notation, showing equipment held to the surface by the apparatus.
Figure 4:
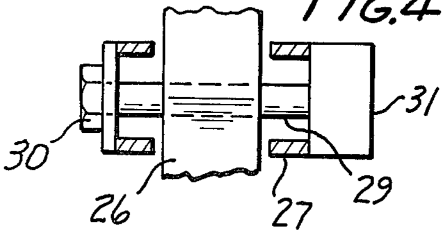
FIG. 4 shows a portion of FIG. 3 viewed at line 4—4 in FIG. 3.
Figure 5:
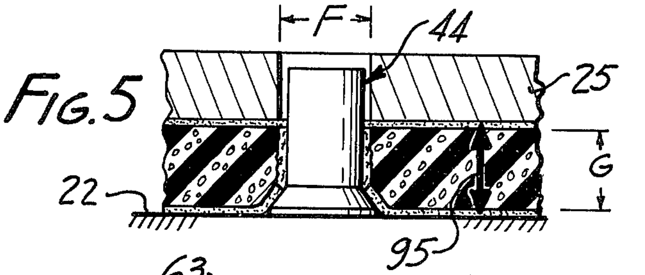
FIG. 5 is a fragment of FIG. 2, showing the consequences of an attempt to pry the plate of FIG. 1 from the surface.

FIG. 1 shows apparatus 20 for holding a piece of equipment 21 (FIG. 3) to a surface 22, for example the top of a desk or the top of a table. The apparatus includes plate means 25, in this case a rigid single plate made of strong hard metal such as steel. It includes a plurality of integral arches 26. As best seen in FIGS. 3 and 4, the protected equipment 21 has attached to it matching arches 27 which, when the legs 28 of the equipment are rested atop the plate or against the surface, as preferred, can be pierced by a lockbolt 29 which has a head 30 at one end and a removable lock 31 at the other. In this way the equipment will be releasably held to the security apparatus, and can be removed therefrom by opening the lock. There will be as many locks and lockbolts as desired appropriate to the number of arches provided and the degree of security which is sought.

Because this invention does not pertain to this portion of the apparatus, it will not further be described herein. Suffice it to say that a skirt or other means is ordinarily provided to cover and surround the plate and make as close an approach as possible to the surface so as to exclude strong prybars therefrom. However, it has been found that such an arrangement cannot practically preclude the entry of strong piano wire used as a garrot, and that the plates can sometimes be quickly cut from the surface of the table by means of a garrot 35 in the manner suggested in FIG. 1. Such a garrot has a length of wire 36 and a pair of handles 37 to form the loop shown. Then by drawing the handles apart, as shown by arrows 38, the wire forms a decreasing loop, cutting below the rigid plate unless means is provided to prevent it.

According to this invention, plated 25 bears a layer of foam 40 on its lower surface 41. An adhesive bond 42 joins the foam layer to said lower surface. A second adhesive bond 43 is provided to join the foam layer to surface 22. These bonds are preferably made of material having greater resistance to cutting than the foam itself. This will guide the wire into the foam. For example, the foam can conveniently be made of closed-cell polyethylene, polystyrene, or natural or synthetic rubber, and the bonding material itself may be made of a compatible pressure-sensitive adhesive. The foam will customarily be on the order of approximately ⅛ inch thick. The plate may be mounted ("attached") to the surface simply by pressing the lower adhesive bond 43 against it. The foam layer is defined as a portion of "adhesive bond means" by which the plate 25 ("plate means") is attached to a surface such as surface 22.

Garrot-resistant means according to this invention includes a plurality of cut-resistant bodies 44, 45, 46, 47, which are at least three in number and which are disposed in a pattern such that at least one of them is off of a line drawn between the two others, thereby to bound an area of such size from which a garrot will be excluded that the equipment, together with the plate, cannot readily be lifted or pried away from the surface. In the preferred embodiment of the invention, the plate will be rectangular, and one of these bodies will be provided adjacent to each of its corners, thereby providing maximum protection.

Figure 2:
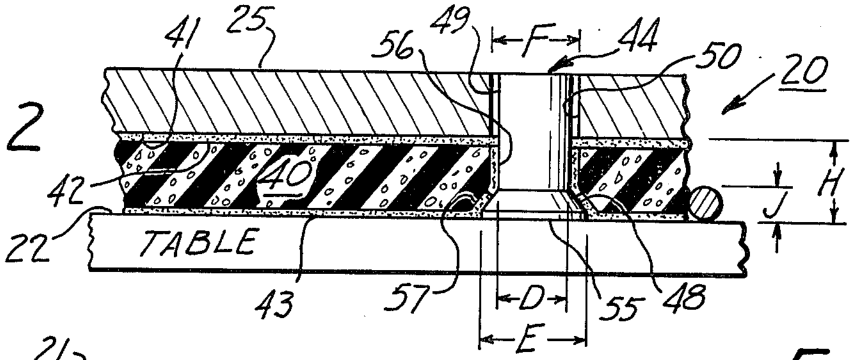
FIG. 2 is a fragmentary cross-section taken at line 2—2 in FIG. 1.

The bodies are all alike, and therefore only one will be described in detail. Each of them is an elongated body having a skirt 48 (FIG. 2) at its lower end, the skirt tapering inwardly as it extends upwardly away from the surface 22 and toward the plate. A shank 49 is contiguous to the skirt and extends upwardly into an aperture 50 in the plate. The shank has a diameter D, and the skirt has a diameter E. The aperture has a diameter F. The diameter F is preferably greater than the diameter D so that there can be a spacing between the shank and the metal plate to avoid the clatter and noise which might be caused by their contact when the equipment is operated.

Adhesive band means 55 is disposed on the skirt end of the body to attach it to the surface independently of the plate. A typical adhesive bond material applied directly on the rivet is useful. Preferably the thickness of the bonding material is between approximately 0.005 and 0.006 inch, with the latter its maximum thickness. The reason for this dimensional limitation is thart a practical wire size for a thief to use must be approximately 0.010 inch or larger diameter "J". The wire is too weak if it is smaller. Therefore, a practical wire will not be able to be pulled under the skirt end of the body to cut the body loose, but instead will be deflected upwardly by the skirt. The head of the cut resistant body is in "substantial contiguity" with the surface, because the bond material is so thin that the space it creates does not adversely affect the function of excluding a practical wire from between the head and the surface.

Similarly, it will be noted that a hole 56 will have been punched out of the foam and adhesive bands to pass the shank of the body, but it will be small enough that a portion 57 may lie on contiguity on the top of the skirt so as to aid in holding this body to the surface. More particularly, when a garrot wire is brought in toward the body, the material of both adhesive bonds 42 and 43 is customarily harder than the foam. The lower layer will aid in deflecting the wire upwardly where the wire will be trapped between the lower surface 41 of the plate and the shank of the body. A suitable material for the bodies is any material which will not readily be cut by the wire. Often the body will merely be an inexpensive iron or aluminum rivet, although stronger material may be used instead.

Figure 6:
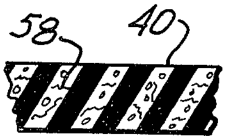
FIG. 6 shows an optional material for use in the device of FIG. 1.

FIG. 6 illustrates that the foam layer may have a filler material. In this case, foam 40 is shown filled with randomly-oriented glass fibers 58, which will make it more difficult for a wire to cut through the foam itself. Instead it is likely to become tangled in it.

The preferred embodiment described above has the advantage that the bodies are attached directly to the surface, completely and independently of the rigid plate. Also the advantage exists that they have not had to penetrate the surface of the furniture itself. Should such penetration not be undesirable, then it is possible instead to utilize a body 60 (FIG. 7) which can be driven into the surface as shown. The remainder of the apparatus is identical, with the difference that a nail 61 with a shank 62 and a head 63 is simply driven through the aperture 50 instead of bonding the body to the surface with its shank extending upwardly. The head need not be provided, and sometimes will not be, because the effectiveness of the device is derived from the shank. This also shows that a skirt need not be provided on the body so long as a shank exists which is cut-resistant. The head on the nail will be used when additional hold-down power is desired, for example to resist prying.

Figure 9:
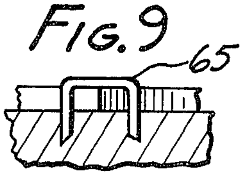
FIG. 9 is a cross-section taken at line 9—9 in FIG. 8.
Figure 8:
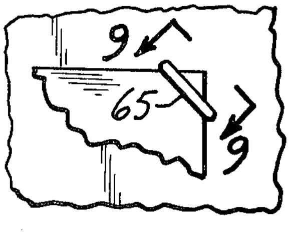
FIG. 8 is a fragmentary plan view in another embodiment of the invention.

It is best for the bodies to be in sufficient contiguity to the plate that a garrot wire cannot readily be brought into a proscribed area and the best arrangement for this is to have the bodies lie within the boundary of the plate itself. However, FIGS. 8 and 9 show that external means, provided that they are not unduly spaced from the plate, can be used instead. While a single nail driven in direct adjacency to the plate is useful, a staple 65 across each corner of the plate can advantageously be provided and driven into the surface as best shown in FIG. 9.

Figure 10:
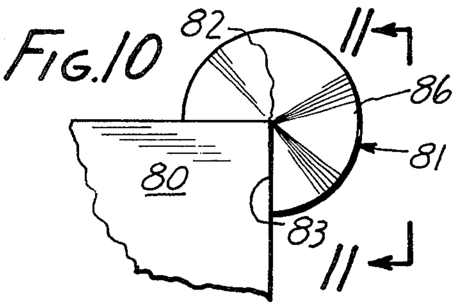
FIG. 10 is a plan view of a fragment of another embodiment of the invention.
Figure 11:
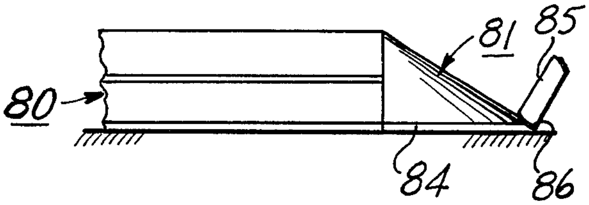
FIG. 11 is a side elevation taken at line 11—11 in FIG. 10.

The foregoing constructions are useful for new installations. However, there have been many installations of prior art devices wherein a retrofit technique is desirable, and these are shown in FIGS. 10–13. FIG. 10 shows a plate 80 similar to plate 25 and which also includes the foam and adhesive layers as aforesaid. However, instead of being provided with an aperture to receive the cut-resistant bodies, a plurality of cut-resistant bodies 81, at least three in number, is provided, one at each corner 82 or other extremity of the device. Each body is basically conical with a cutout portion 83 to receive a corner 82. Adhesive bond means 84 with the same properties as bonding means 55 is provided to attach this body to the surface 22. Further to prevent the entry of a garrot wire, a scribing tool 85 may be used to press the material down to a fine feather edge 86 at its periphery. For this purpose, a relatively soft aluminum alloy may be used for the body. This is sufficiently cut-resistant and can readily be formed to the said feather edge.

Figure 12:
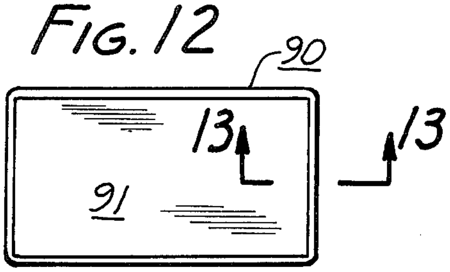
FIG. 12 is a plan view of yet another embodiment of the invention.
Figure 13:
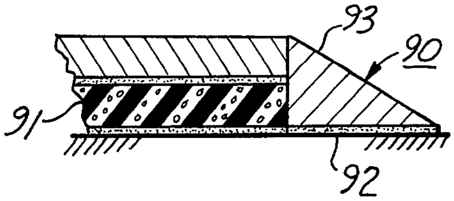
FIG. 13 is a fragmentary cross-section taken at line 13-13 in FIG. 12.

In FIG. 12 an elongated cut-resistant body 90 is provided as the equivalent of at least three individual bodies and is shown framing a plate 91. In cross-section it will be seen that the body 90 has a triangular cross-section with adhesive-bond means 92 to hold it to the surface, and a sloped outer edge 93 to deflect a garrot wire.

In all embodiments, the cut-resistant bodies are in adjacency to the plate. The adjacency in FIGS. 1–9 and 14–16 is within the boundary of the plate means. In the embodiments of FIGS. 10–13, it is external. In all cases the body is located close enough to the plate to exclude a garrot wire from between them. Also, the body in every embodiment is substantially contiguous to the surface. The adhesive bond means is thinner than a practical garrot wire and this is the meaning of the term "contiguous" as used herein.

When apparatus 20 in FIG. 1 is to be utilized, the bodies are placed in their approximate locations (often there is a peelable layer protecting the bonding material which is removed before the apparatus is set) and then the plate is placed where desired and pressed down against the surface and against the garrot-resistant bodies. This will press the garrot-resistant bodies into contiguity with the surface so as to attach them at their respective head ends, and also to attach the plate by means of the lower adhesive bond 43. In so doing, the portion of the foam layer adjacent to the skirt will have been somewhat compressed, and this will push a small portion of foam material against the shank of the body which will tend to deaden the noise by preventing direct transmission of physical forces between the plate and the body itself.

Now, should a garrot wire be brought into the foam, it can readily cut it, unless the glass-filled foam is used, but cannot as readily cut either of the adhesive bonds 42 and 43, because they are relatively harder. If the wire scrapes along near the upper edge of the foam, it will come into bearing contiguity with the shank of the body and be stopped there, or, if it strikes the skirt, it will be brought up along it to the shank and again will be stopped. Should a prybar be utilized, as shown schematically by arrow 95 in FIG. 5, where dimension G is shown, which is larger than dimension H in FIG. 2, the foam will simply stretch to accomodate the force, but will not yield. The foam material thereby provides additional security in the event of an attempt to pry the device apart. The height of the cut-resistant bodies is such that a clearance cannot readily be formed between its top and bottom of the plate when the plate is pryed up.

Figure 7:
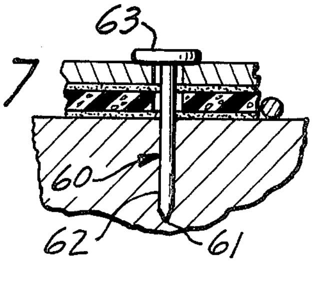
FIG. 7 is a fragmentary cross-section showing another embodiment of the invention.

The results are the same in the embodiment of FIG. 7 where a wire will readily cut through the foam but will be stopped by the shank of the nail.

In FIGS. 8 and 9, the staple directly prevents approach to the foam as though a single body were disposed anywhere along the line which connects the two staple prongs.

In FIG. 10 the garrot wire will simply skid up along the sloped edge of the body 81 at each of the corners and does not have a chance to get under the plate at all. The same is true in the embodiments of FIGS. 12 and 13 where the garrot wire is entirely excluded from the periphery.

By appropriate positioning and selection of numbers of the bodies, a garrot wire can be excluded from sufficient of the area of the bond between the plate and the surface as to prevent ready lifting or forcible removal from the surface. Therefore, the one known solution to frustrate the purpose of the basic device has now been overcome by means which prevent the passage of the garrot wire beyond a proscribed boundary.

The area of the head defined by diameter E should be greater than the area of the sloped shoulder which makes certain that the bond between the body and the surface will not be broken by a lifting of the plate. Thus, the garrot-resisting feature cannot be frustrated by prying the plate high enough that the bottom surface of the rigid plate will be sufficiently spaced from the top of the body that the garrot wire can be pulled between them. In particular, it will be noted that lifting the plate does not lift the body, and therefore the body remains in place to prevent the garrot operation subsequent to an attempted prying operation.

The plate means will often be a single rigid plate, as already shown. However, some furniture tops are not truly flat, and large plates are sometimes warped. When this occurs, the divergence from true parallelism between the surface and the plate results in a varying amount of foam compression in different locations. As a consequence, the foam and its bonding means can be placed in tension which, over a period of time, can permit breakage of the bond locally. This can be avoided by making the plate means somewhat flexible, such as by articulation between parts thereof, or by forming it in more than one part.

Figure 14:
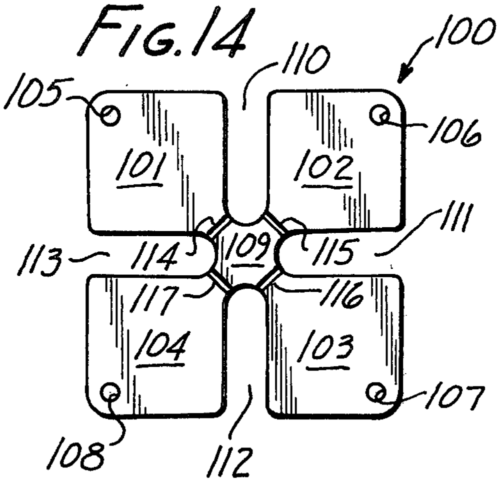
FIGS. 14-16 are plan views showing alternate embodiments of plate means.

For example, FIG. 14 shows plate means 100 which includes four rigid plates 101, 102, 103, and 104, each with an aperture 105, 106, 107 and 108, respectively. The plates are interconnected by a central portion 109. Slots 110, 111, 112 and 113 divide the plates from one another. Grooves 114, 115, 116 and 117 at the edge of portion 109 provide flexibility for the plates to be bent away from parallelism with one another to accommodate for surface irregularities. Also any difference from flatness can be compensated for by bending at the grooves.

Figure 15:
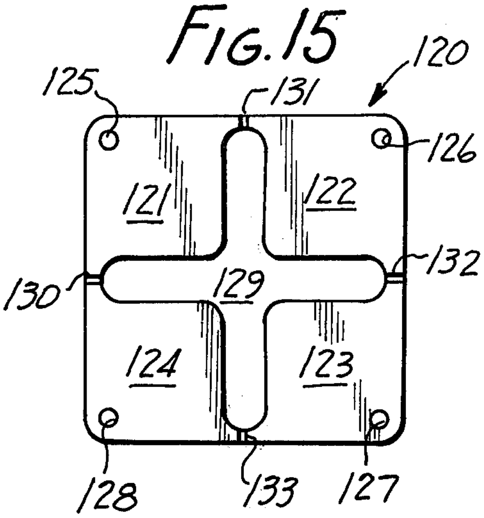

Central portion 109 in FIG. 14, and the regions at grooves 130–133 in FIG. 15 are sometimes referred to herein as "web means". The web means serves flexibly to interconnect the individual plates.

In FIG. 15, plate means 120 has four plates 121, 122, 123 and 124, with apertures 125, 126, 127 and 128 respectively. A four-armed cut-out 129 forms the plates. Grooves 130, 131, 132 and 133 provide flexibility to the plate means. The plates themselves are relatively rigid.

Figure 16:
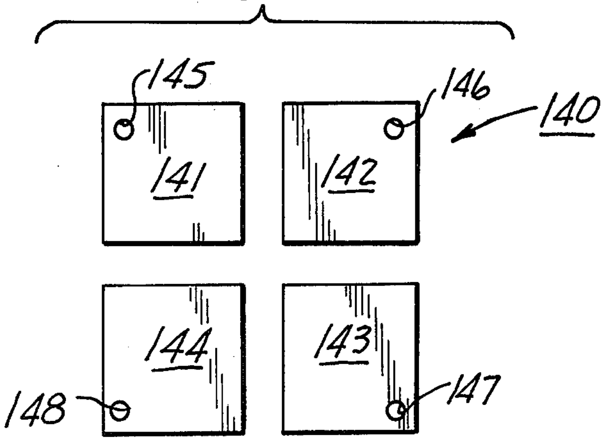

FIG. 16 shows that the plates need not by physically interconnected. Here, plate means 140 comprises plates 141, 142, 143, 144 with respective apertures 145, 146, 147 and 148. These plates provide the same advantages as those in FIGS. 14 and 15, except that they must be handled individually. Usually, however, they will be mounted to the foam so there is no problem.

In FIGS. 14–16, the bodies are used as in FIG. 1, and provide the same advantages in resisting garroting, while the plates provide the same protection against being pried off the surface.

In FIGS. 14 and 15, the grooves are provided to facilitate bending the plate means. However they are merly one example of a means for such a purpose. Instead, the interconnecting parts need only be made narrow enough that they are readily bent.

This invention is not to be limited by the embodiments shown in the drawings and described in the description, which are given by way of example and not of limitation, but only in accordance with the scope of the appended claims.

I claim:

1. Garrot-resistant means for use with apparatus for holding equipment to a surface, said apparatus having plate means to which the equipment is attachable, an adhesive bond means on the bottom of said plate means for attaching the plate means to said surface, said garrot-resistant means comprising: at least three cut-resistant bodies attachable to the said surface independently of and adjacent to said plate means, each body being of sufficient length as to extend from at least substantial contiguity with said surface to an elevation above said bottom of said plate means, at least one of said bodies being disposed off of a line drawn between two of the other bodies, whereby to form a pattern which will exclude a garrot wire from cutting through said adhesive bond means to permit the plate means to be cut loose from the surface, or through sufficient of said adhesive bond means to permit the plate means readily to be broken loose from the said surface.

2. Apparatus according to claim 1 in which said body comprises an elongated member adapted to be driven into said surface.

3. Apparatus according to claim 2 in which said body is adapted to be driven into said surface in sufficient adjacency to said plate means to prevent the passage between them of a wire whose diameter is greater than about 0.010 inch.

4. Apparatus according to claim 2 in which said body includes a head adapted to bear against the plate means.

5. Apparatus according to claim 1 in which said plate means includes an aperture for each body, and in which each body comprises an axially-extending member of length sufficient to project into a respective aperture, and an adhesive bond means for attaching said body to said surface.

6. Apparatus according to claim 5 in which said adhesive bond means is less than about 0.010 inch thick.

7. Apparatus according to claim 5 in which said body includes a skirt adjacent to said surface when attached thereto, said skirt tapering upwardly and narrowing as it extends away from the surface, and a shank projecting into an aperture in the plate means.

8. Apparatus according to claim 1 in which the plate means comprises a single plate.

9. Apparatus according to claim 5 in which the plate means comprises a single plate.

10. Apparatus according to claim 1 in which said plate means comprises a plurality of plates interconnected by a web means.

11. Apparatus according to claim 5 in which said plate means comprises a plurality of plates interconnected by a web means.

12. Apparatus according to claim 1 in which said plate means comprises a plurality of plates attached to said foam layer.

13. Apparatus according to claim 5 in which said plate means comprises a plurality of plates attached to said foam layer.

14. Apparatus for holding equipment to a surface, comprising: plate means to which the equipment is attachable; an adhesive bond means on the bottom of said plate means for attaching the plate means to said surface; and garrot-resistant means comprising at least three cut-resistant bodies attachable to the said surface independently of and adjacent to said plate means, each body being of sufficient length as to extend from at least substantial contiguity with said surface to an elevation above said bottom of said plate means, at least one of said bodies being disposed off of a line drawn between two of the other bodies, whereby to form a pattern which will exclude a garrot wire from cutting through said adhesive means to permit the plate means to be cut loose from the surface, or through sufficient of said adhesive means to permit the plate means to be cut loose from the surface, or through sufficient of said adhesive means to permit the plate means readily to be broken loose from said surface.

15. Apparatus according to claim 14 in which said body comprises an elongated member adapted to be driven into said surface.

16. Apparatus according to claim 15 in which said body is adapted to be driven into said surface in sufficient adjacency to said plate means to prevent the passage between them of a wire whose diameter is greater than about 0.010 inch.

17. Apparatus according to claim 15 in which said body includes a head adapted to bear against the plate means.

18. Apparatus according to claim 14 in which said plate means includes an aperture for each body, and in which each body comprises an axially-extending member of length sufficient to project into a respective aperture, and an adhesive bond means for attaching said body to said surface.

19. Apparatus according to claim 18 in which said adhesive bond means is less than about 0.010 inch thick.

20. Apparatus according to claim 18 in which said body includes a skirt adjacent to said surface when attached thereto, said skirt tapering upwardly and narrowing as it extends away from the surface, and a shank projecting into an aperture in the plate.

21. Apparatus according to claim 14 in which the plate means comprises a single plate.

22. Apparatus according to claim 18 in which the plate means comprises a single plate.

23. Apparatus according to claim 14 in which said plate means comprises a plurality of plates interconnected by a web.

24. Apparatus according to claim 18 in which said plate means comprises a plurality of plates interconnected by a web means.

25. Apparatus according to claim 14 in which said plate means comprises a plurality of plates attached to said foam layer.

26. Apparatus according to claim 18 in which said plate means comprises a plurality of plates attached to said foam layer.

* * * * *